(12) United States Patent
Wang et al.

(10) Patent No.: US 10,390,100 B2
(45) Date of Patent: *Aug. 20, 2019

(54) METHOD AND SYSTEM FOR CONTROLLING A CENTRALIZED CONTENT DISTRIBUTION SYSTEM WITH A REMOTE CONTROL

(71) Applicant: The DIRECTV Group, Inc., El Segundo, CA (US)

(72) Inventors: Phillip T. Wang, Rockville, MD (US); Sean S. Lee, Potomac, MD (US); Scott D. Casavant, Germantown, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/445,090

(22) Filed: Feb. 28, 2017

(65) Prior Publication Data

US 2017/0171637 A1 Jun. 15, 2017

Related U.S. Application Data

(62) Division of application No. 14/587,700, filed on Dec. 31, 2014, now Pat. No. 9,621,961.

(51) Int. Cl.
| | |
|---|---|
| *H04N 7/18* | (2006.01) |
| *H04N 21/6547* | (2011.01) |
| *H04N 21/6377* | (2011.01) |
| *H04N 21/2387* | (2011.01) |
| *H04N 21/6587* | (2011.01) |
| *H04N 21/41* | (2011.01) |
| *H04N 21/422* | (2011.01) |
| *H04N 21/61* | (2011.01) |
| *H04N 5/783* | (2006.01) |

(52) U.S. Cl.
CPC ..... *H04N 21/6547* (2013.01); *H04N 21/2387* (2013.01); *H04N 21/4126* (2013.01); *H04N 21/422* (2013.01); *H04N 21/42225* (2013.01); *H04N 21/42227* (2013.01); *H04N 21/6143* (2013.01); *H04N 21/6377* (2013.01); *H04N 21/6587* (2013.01); *H04N 5/783* (2013.01)

(58) Field of Classification Search
CPC .......... H04N 21/6547; H04N 21/2387; H04N 21/42225; H04N 21/42227; H04N 21/43615; H04N 21/6143; H04N 21/6587
See application file for complete search history.

(56) References Cited

U.S. PATENT DOCUMENTS

| | | | | |
|---|---|---|---|---|
| 2002/0138830 | A1* | 9/2002 | Nagaoka | H04H 60/31 725/14 |
| 2004/0068752 | A1* | 4/2004 | Parker | H04N 5/4403 725/120 |
| 2007/0220547 | A1* | 9/2007 | Teskey | H04N 7/106 725/39 |

(Continued)

*Primary Examiner* — John R Schnurr
(74) *Attorney, Agent, or Firm* — Harness, Dickey & Pierce, P.L.C.

(57) ABSTRACT

A system and method includes an input device, a client device registering an input device to form an association and a server device registering the input device and registering the association with the server device. The input device broadcasts a control signal to the client device and the server device. The server device receiving the control signal directly from the input device. The server device communicates a response signal to the client device in response to the receiving the control signal.

10 Claims, 14 Drawing Sheets

(56) References Cited

U.S. PATENT DOCUMENTS

| | | | |
|---|---|---|---|
| 2007/0290876 A1* | 12/2007 | Sato | G08C 23/04 340/4.33 |
| 2009/0228919 A1* | 9/2009 | Zott | H04N 7/17318 725/34 |
| 2011/0116482 A1* | 5/2011 | Ansari | H04N 21/4122 370/338 |
| 2011/0138416 A1* | 6/2011 | Kang | G06F 3/0482 725/39 |
| 2011/0162020 A1* | 6/2011 | Kahn | H04N 21/4263 725/82 |
| 2012/0030712 A1* | 2/2012 | Chang | H04N 5/44543 725/52 |
| 2013/0145409 A1* | 6/2013 | Vince | H04N 21/4227 725/93 |
| 2017/0026714 A1* | 1/2017 | Conan | H04N 21/23439 |

* cited by examiner

METHOD AND SYSTEM FOR CONTROLLING A CENTRALIZED CONTENT DISTRIBUTION SYSTEM WITH A REMOTE CONTROL

CROSS-REFERENCE TO RELATED APPLICATIONS

This application is a divisional of U.S. patent application Ser. No. 14/587,700 filed on Dec. 31, 2014. The entire disclosure of the above application is incorporated herein by reference.

TECHNICAL FIELD

The present disclosure relates generally communicating between a server device and a client device, and, more specifically, to control content shown to a client device using an input device.

BACKGROUND

The statements in this section merely provide background information related to the present disclosure and may not constitute prior art.

Satellite television has become increasingly popular due to the wide variety of content and the quality of content available. A satellite television system typically includes a set top box that is used to receive the satellite signals and decode the satellite signals for use on a television. The set top box typically has a memory associated therewith. The memory may include a digital video recorder or the like as well as storage for the operating code of the set top box. Because of the numerous components associated with the set top box, the set top box for each individual television is relatively expensive.

Satellite television systems typically broadcast content to a number of users simultaneously in a system. Satellite television systems also offer subscription or pay-per-view access to broadcast content. Access is provided using signals broadcast over the satellite. Once access is provided, the user can access the particular content.

Many content providers are offering systems that provide a centralized server with a large video storage device therein. Multiple clients are connected to the server to allow video content to be displayed at a display device associated with the server. Typically, the client device is controlled using an infrared remote control device that sends a key command from the client to the server based upon buttons selected by the user. These commands are small bitwise and are acted upon by the server. Communicating all remote control commands through the client may cause some unnecessary delays in generating a response from the server.

SUMMARY

The present disclosure provides a method and system for communicating between the client device, server device and an input device, such as a remote control, to provide an improved customer experience.

In one aspect of the disclosure, a method of communicating between a client device and a server device through a local area network includes registering an input device with the client device to form an association, registering the input device with the server device, registering the association with the server device, broadcasting a control signal from the input device to the client device and the server device, receiving the control signal directly from the input device at the server device and communicating a response signal to the client device from the server device in response to the receiving the control signal.

In another aspect of the invention, a method of communicating between a client device and a server device includes designating a first plurality of control signals for the client device, designating a second plurality of control signals different from the first plurality of signals for the server device, receiving a first signal of the first plurality of signals at the client device and the server device not from the client device, in response to receiving the first signal, generating a first response signal at the client device, receiving a second signal of the second plurality of signals at the client device and the server device, and in response to receiving the second signal, generating a second response signal at the server device and not from the client device.

In a further aspect of the disclosure, a system includes an input device, a client device registering an input device to form an association, a server device registering the input device, and registering the association with the server device. The input device broadcasts a control signal to the client device and the server device. The server device receiving the control signal directly from the input device. The server device communicates a response signal to the client device in response to the receiving the control signal.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
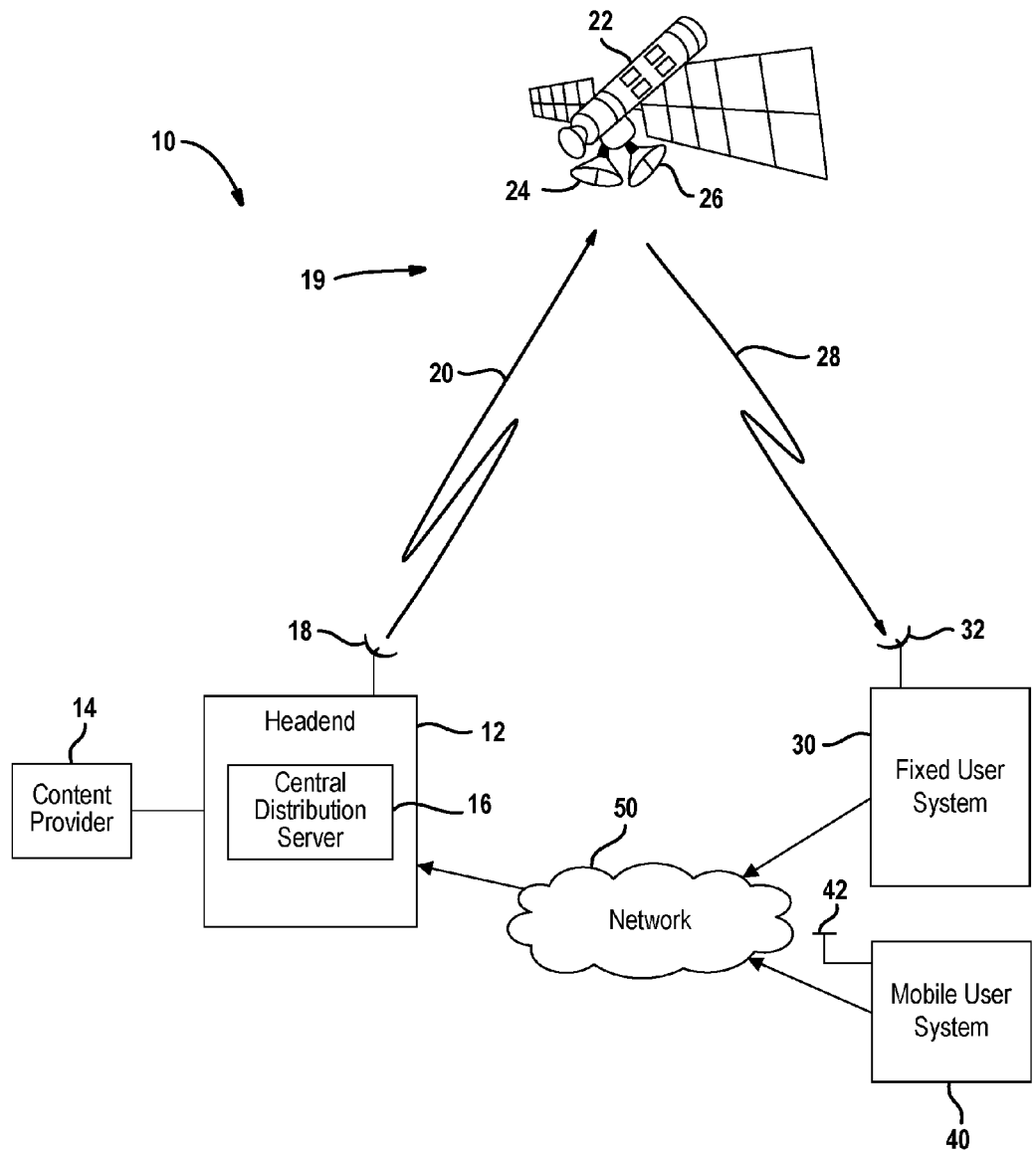
FIG. 1 is a high level block diagrammatic view of a satellite distribution system according to the present disclosure.

The following description is merely exemplary in nature and is not intended to limit the present disclosure, application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical OR. It should be understood that steps within a method may be executed in different order without altering the principles of the present disclosure.

The teachings of the present disclosure can be implemented in a system for communicating content to an end user or user device. Both the data source and the user device may be formed using a general computing device having a memory or other data storage for incoming and outgoing data. The memory may comprise but is not limited to a hard drive, FLASH, RAM, PROM, EEPROM, ROM phase-change memory or other discrete memory components.

Each general purpose computing device may be implemented in analog circuitry, digital circuitry or combinations thereof. Further, the computing device may include a microprocessor or microcontroller that performs instructions to carry out the steps performed by the various system components.

A content or service provider is also described. A content or service provider is a provider of data to the end user. The service provider, for example, may provide data corresponding to the content such as metadata as well as the actual content in a data stream or signal. The content or service provider may include a general purpose computing device, communication components, network interfaces and other associated circuitry to allow communication with various other devices in the system.

Further, while the following disclosure is made with respect to the delivery of video (e.g., television (TV), movies, music videos, etc.), it should be understood that the systems and methods disclosed herein could also be used for delivery of any media content type, for example, audio, music, data files, web pages, advertising, etc. Additionally, throughout this disclosure reference is made to data, content, information, programs, movie trailers, movies, advertising, assets, video data, etc., however, it will be readily apparent to persons of ordinary skill in the art that these terms are substantially equivalent in reference to the example systems and/or methods disclosed herein. As used herein, the term title will be used to refer to, for example, a movie itself and not the name of the movie.

While the following disclosure is made with respect to example DIRECTV® broadcast services and systems, it should be understood that many other delivery systems are readily applicable to disclosed systems and methods. Such systems include wireless terrestrial distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a service provider and integrated receiver/decoders (IRDs) as described below can be reallocated as desired without departing from the intended scope of the present patent.

Referring now to FIG. 1, a communication system 10 is illustrated. Communication system 10 includes a head end 12 that is used as a processing and transmission source. The head end 12 may be referred to as a head end. A plurality of content providers 14, only one of which illustrated, may provide content to the head end 12. The head end 12 receives various types of content from a content provider 14 and communicates the content to system users. The head end 12 may also be associated with a central distribution server 16. The central distribution server 16 may be incorporated into the head end 12 or may be a separate item. The central distribution server 16 may be used for various types of distribution including resetting a user device, providing a software image communicating advertisements or replacement metadata or providing an updated software image to a user device.

The head end 12 communicates with various user systems through a content delivery system 19. The content delivery system 19 may be one of the various types of systems such as a wired, wireless, Internet Protocols, cable, high frequency system, etc. described above. In this case, a satellite system is illustrated but should not be considered limiting.

Carrying through with the satellite example, the head end 12 includes an antenna 18 for communicating processed content through an uplink 20 to a satellite 22. The satellite 22 may include a receiving antenna 24 and a transmitting antenna 26. The receiving antenna 24 receives the uplink signals 20 from the satellite antenna 18. The transmitting antenna 26 generates downlinks 28 and communicates the downlinks 28 to various user devices.

A fixed user system 30 receives the downlink signals 28 through a receiving antenna 32. The fixed user system 30 is a fixed user system meaning it is stationary. However, some components may be mobile components. The fixed user system 30 may be deployed within a building such as a single-family household, a multi-dwelling unit, or a business. Details of the fixed user system are provided below.

The present disclosure is also applicable to a mobile user system 40. The mobile user system 40 may include a satellite antenna 42. The satellite antenna 42 may be a tracking antenna to account for the mobility of the mobile user system. This is in contrast to the antenna 32 of the fixed user system that may be fixed in a single direction. The mobile user system 40 may include systems in airplanes, trains, buses, ships, and the like.

The fixed user system 30 and the mobile user system 40 may be in communication with a network 50. The network 50 may be a single network or a combination of different networks or different types of networks. The network 50 may, for example, be a broadband wired network or wireless network or a combination thereof. The network 50 may be a one-way network so that data or content may be communicated from the fixed user system 30 or the mobile user system 40 through the network 50 to the head end 12 and the central distribution server 16. Likewise, the network 50 may also be one-way in the other direction so that the content distribution server 16 may communicate content data or other control signals such as a reset signal through the network 50 to the fixed user system 30 and the mobile user system 40. The network 50 may also be a two-way network so that communications may take place between the head end 12, which includes the distribution server 16, and the fixed user system 30 and the mobile user system 40.

Figure 2:
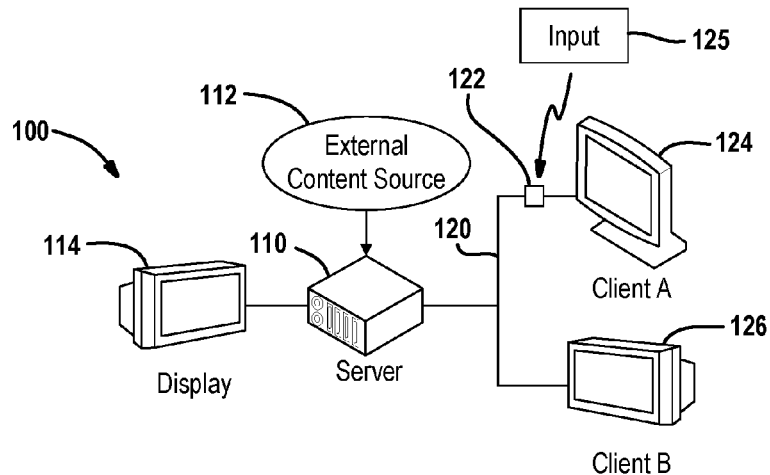
FIG. 2 is a block diagrammatic view of a first network topology.

Referring now to FIG. 2, one example of a user system 100 is illustrated in further detail. The user systems illustrated in FIGS. 2-5 may be mobile or fixed. The user system 100 may include a local network server 110. The local network server 110 may receive content from an external source 112. The external source 112 may be a satellite distribution system as illustrated in FIG. 1 or the other sources described above. In such a case, the external source 112 may be the satellite antenna 32 illustrated in FIG. 1. The external source 112 may be a variety of television signal sources such as an over-the-air tuner, a cable, a wireless system, or an optical system. Various types of signals such as data, music, video, games, audio, advertisements and combinations thereof may be part of the external source.

The server device 110 may act as a set top box for directly communicating content to a display 114. The content in a direct connect may not be renderable content but rather directly displayable signals within a frequency band. The signals to display 114 may also be renderable. The display 114 may be a television or monitor.

The server device 110 may also be in communication with a local area network 120. Although wired connections are illustrated, wireless or optical signals may be used for communicating through the local area network 120. The server device 110 may also communicate with the network 50 illustrated in FIG. 1. In that case, the network 50 is an external network when compared to local area network 120. The local area network of FIG. 2 is formed through the server 110. That is, the server device 110 acts to communicate to both clients A and B as well as acts as an intermediary if client A communicates with Client B, or vice versa.

The server device 110 may communicate with a first client, Client A, using a client device 122. The server device 110 may stream content signals to the client device 122. The server device 110 may also control the display of content and screen displays or remote user interfaces at the client device. The remote user interface may be a graphical user interface for controlling various selections or controls. The client device 122 may perform various functions that will be described below. For example, the client device 122 may render renderable signals from the server for displaying the rendered signals on a display 124 associated with the client device 122. The client device 122 may also select the content and controls from the user interface and communicate the control signals to the server device 110.

The client device 122 may receive signals from an input device 125. The input device 125 may be various types of devices such as a remote control, tablet computer, a cellular phone, a game controller or the like. The input device 125 provides an input command indicative of the user wanting to control a function of the client device or server device. The input may also be a person generating an audio signal comprising a voice signal with spoken words. The input signals from the input device 125 may be in a variety of forms including RF, optical signals, a voice signal or the like. Examples of an input signal type include an audio input signals, a graphical input signal, a gesture signal such as a performing a swipe command on a touch screen of an input device used for the input device 125, a pointing device signal such as a mouse or stylus or another type of graphical input.

The input device 125 may generate broadcast signal that is communicated to the client device 122, the server device or both. As will be described, the client device 122 may receive and communicate the input signal to the server device 110. In response, the server device 110 may generate a response to the client device 122. The server device 110 may also receive the input signal from the input device 125 and respond directly to the client device 122. In this manner, the client device 122 is by-passed. This may allow the server to provide a faster response to the client device 122. As mentioned above, the input signal may also be broadcasted to both the client device 122 and the server device 110. In one example, set forth below, different input signal commands may be responded to by the client device 122 and other commands may be active upon by the server device 110.

Figure 3:
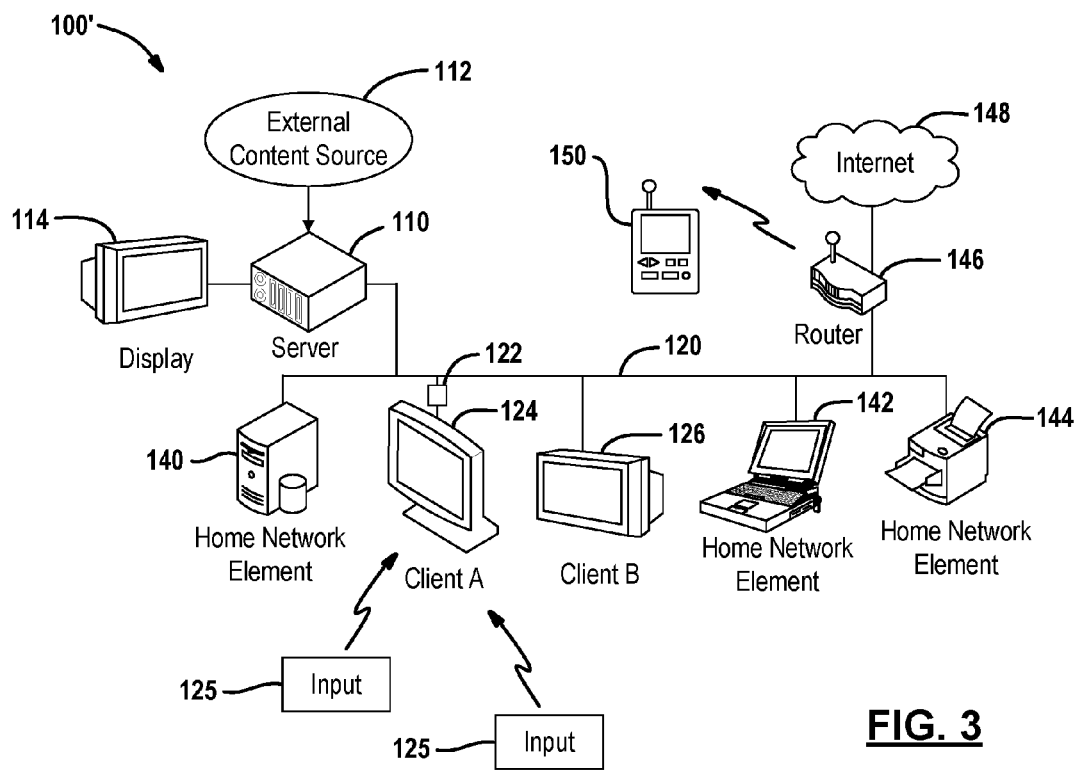
FIG. 3 is a block diagrammatic view of a second example of the network topology.

The input device 125 may actually be two different input devices 125 as is illustrated in FIG. 3. For example, one input device 125 may be a remote control device whereas the second input device 125 may be a gaming controller. Input signals to the client and/or server device may be operated on by either the client or the server dependent upon the signal.

The input device 125 could provide a relatively large amount of data compared to a standard infrared remote control. For the server device to receive the relatively large amount of data, memory in the server device optionally could be allocated, at least temporarily, for receiving the data so that the data may be processed therefrom. It is also possible that the server device has set aside a dedicated amount of memory for receiving the data such that specific memory allocation commands are not necessary.

A second client, Client B 126, may also be in communication with the server device 110 through the local area network 120. Client B 126 may contain an internal client device, not shown, for displaying rendered signals on the display. The internal client device may be functionally equivalent to the standalone client device 122. Because both the first client, Client A 124, and the second client, Client B 126, are in communication directly with the server device 110, the network may be referred to as a closed network. Various numbers of clients may be connected to the local area network 120. The input device 125 may also be in direct communication with the Client B 126. That is, the input device 125 may be directly input to a display or television. The display or television of Client B 126 may process the signals like the client device 122.

Referring now to FIG. 3, a user system 100' which is an open network is illustrated. In this example, the same components described above in FIG. 2 are provided with the same reference numerals. In this example, the local area network 120 may include a number of home network elements. One home network element may be a home network server device 140 or other computing device. Another home network element may include a laptop computer 142 that is in communication with the local area network 120. Another home network element may include a network printer 144 and a router 146. The router 146 may communicate with other devices through an external network such as the Internet 148.

The user system 100' may also have wireless elements associated therewith. The router 146 or another network device may generate wireless signals that allow a wireless device 150 to communicate with at least one server device 110 or 140. The wireless device 150 may, for example, be a personal digital assistant, a cellular phone, a personal media device or a Blu-Ray or DVD player. Of course, other wireless devices may be part of the network.

Figure 4:
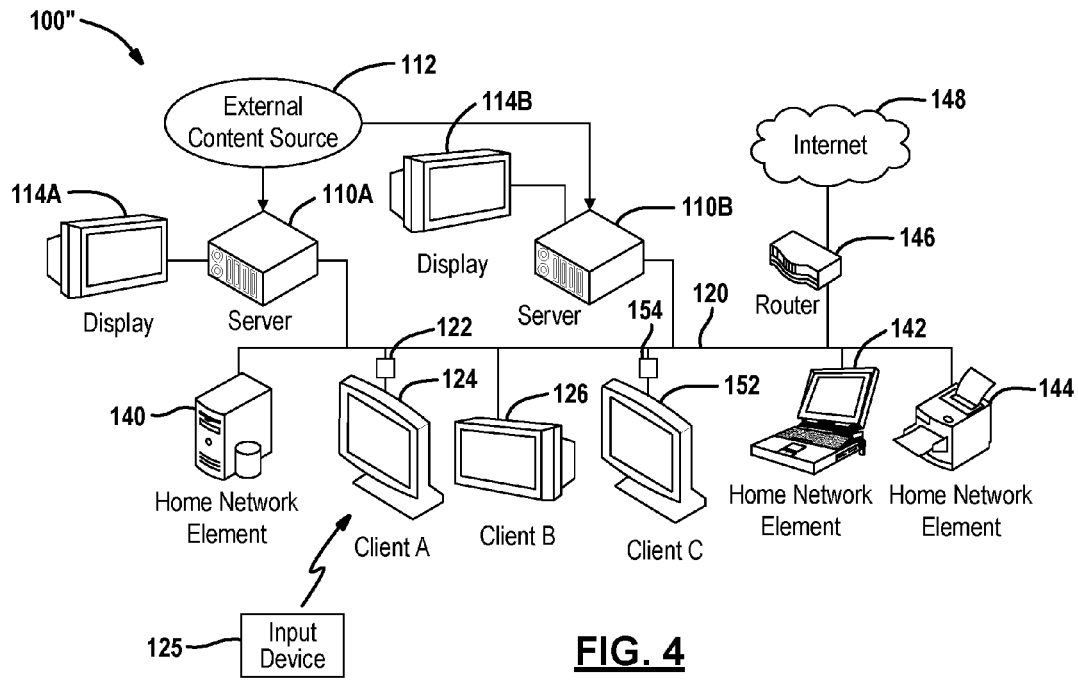
FIG. 4 is a block diagrammatic view of a third example of a network topology.

Referring now to FIG. 4, another example of a user system 100″ is illustrated. In this example, the same elements from FIGS. 2 and 3 are provided with the same reference numerals. The local area network 120 may also include two server devices 110A and 110B. Each server device may include an optional display device 114A, 114B, respectively. In this example a third client, Client C, is illustrated having a display 152 and a client device 154.

Figure 5:
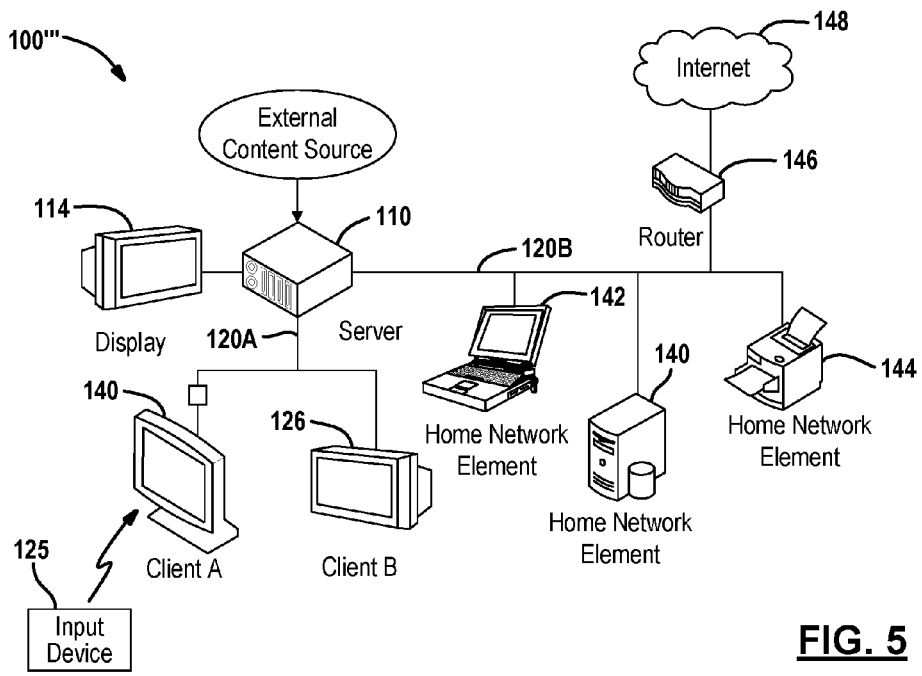
FIG. 5 is a block diagrammatic view of a fourth example of a network topology.

Referring now to FIG. 5, providing customers with reliable service is important. A fourth example of the user system 100′″ is illustrated. In certain cases, a home network may not be as reliable as a direct connection. In FIG. 5, the local area network is divided into a first local area network 120A between the first client, Client A 140, the second client, Client B 126, and the server device 110. That is, the server device 110 communicates through the first local area network 120A with both Client A and Client B and any other clients that may be on the system. A second local area network 120B may communicate with other devices within the home network such as a computer or home network server 140, the laptop computer 142, the printer 144 and the router 146.

Figure 6:
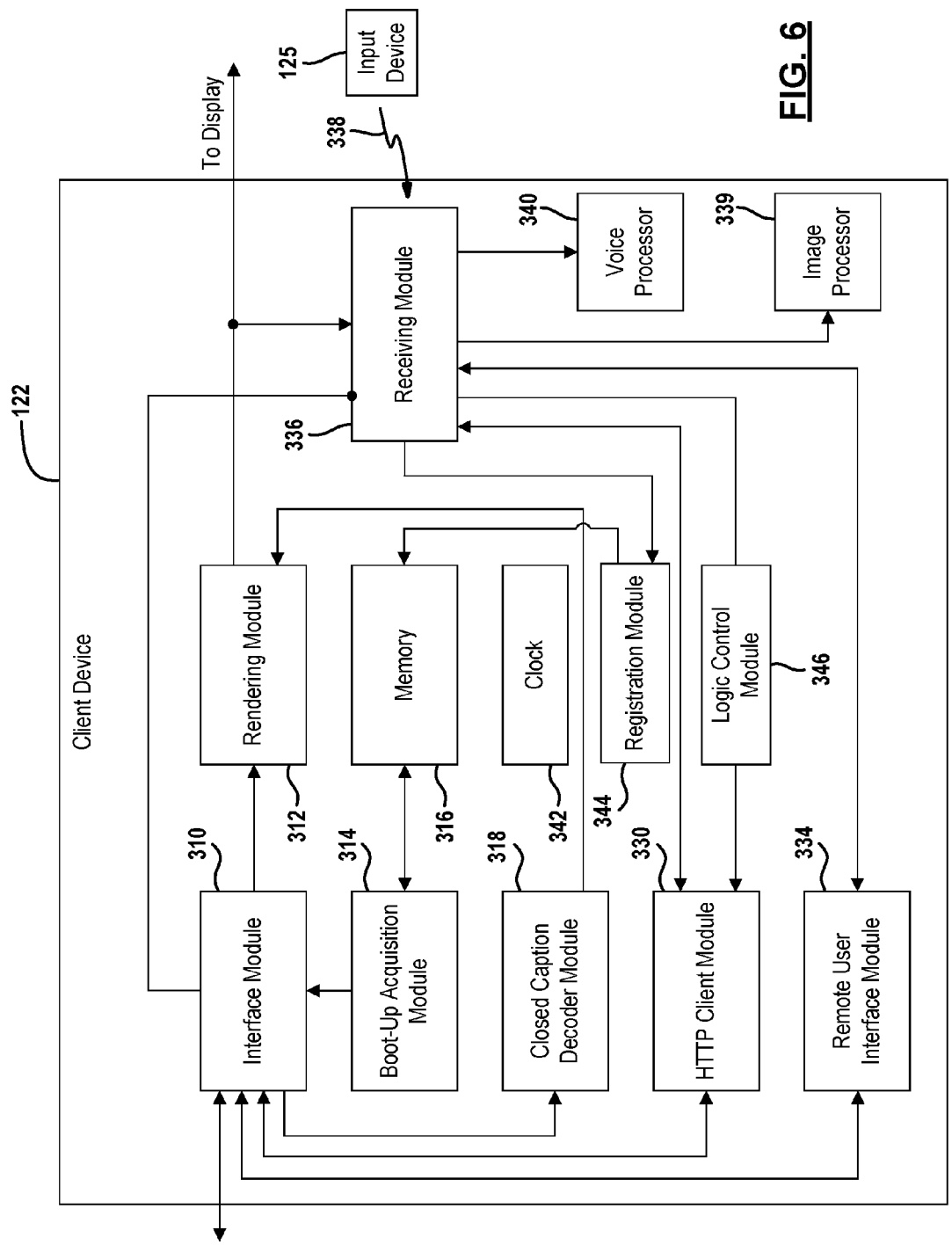
FIG. 6 is a simplified block diagrammatic view of a client device.

Referring now to FIG. 6, a client device 122 is illustrated in further detail. The client device 122 may include various component modules for use within the local area network and for displaying signals. The display of signals may take place by rendering signals provided from the network. It should be noted that the client device 122 may comprise various different types of devices or may be incorporated into various types of devices. For example, the client device 122 may be a standalone device that is used to intercommunicate through a local area network to the server device 110 illustrated in FIGS. 2-5. The client device 122 may also be incorporated into various types of devices such as a television, a video gaming system, a hand-held device such as a phone or personal media player, a computer, or any other type of device capable of being networked.

The client device 122 may include various component modules such as those illustrated below. It should be noted that some of the components may be optional components depending on the desired capabilities of the client device and fixed user system. It should also be noted that the client device may equally apply to the mobile user system 40 of FIG. 1.

The client device 122 includes an interface module 310. The interface module 310 may control communication between the local area network and the client device 122. As mentioned above, the client device 122 may be integrated within various types of devices or may be a standalone device. The interface module 310 communicates with a rendering module 312. The rendering module 312 receives formatted signals through the local area network that are to be displayed on the display. The rendering module 312 merely places pixels in locations as instructed by the formatted signals. Rendering may also take place using vector graphics commands that instruct a group of pixels to be formed by the client based on simple instructions. By not including a decoder, the rendering module 312 will allow consistent customer experiences at various client devices. The rendering module 312 communicates rendered signals to the display of the device or an external display.

A boot-up acquisition module 314 may provide signals through the interface module 310 during boot-up of the client device 122. The boot-up acquisition module 314 may provide various data that is stored in memory 316 through the interface module 310. The boot-up acquisition module 314 may provide a make identifier, a model identifier, a hardware revision identifier, a major software revision, and a minor software revision identifier. Also, a download location on the server device for the client device to download a boot image may also be provided. A unique identifier for each device may also be provided. However, the server device is not required to maintain a specific identity of each device. Rather, the non-specific identifiers may be used such as the make, model, etc. described above. The boot-up acquisition module 314 may obtain each of the above-mentioned data from memory 316.

A closed-caption decoder module 318 may also be included within the client device 122. The closed-caption decoder module 318 may be used to decode closed-captioning signals. The closed-captioning decoder module 318 may also be in communication with rendering module 312 so that the closed-captioning may be overlaid upon the rendered signals from the rendering module 312 when displayed upon the display associated with the client device.

Communications may take place using HTTP client module 330. The HTTP client module 330 may provide formatted HTTP signals to and from the interface module 310.

A remote user interface module 334 allows clients associated with the media server device to communicate remote control commands and status to the server device. The remote user interface module 334 may be in communication with the receiving module 336. The receiving module 336 may receive the signals from a remote control or input device 125 (FIGS. 2-6) through input signal 338 associated with the display and convert them to a form usable by the remote user interface module 334. The remote user interface module 334 allows the server device to send graphics and audio and video to provide a full featured user interface within the client. Screen displays may be generated based on the signals from the server device. Thus, the remote user interface module 334 may also receive data through the interface module 310. It should be noted that modules such as the rendering module 312 and the remote user interface module 334 may communicate and render both audio and visual signals.

The receiving module 336 may receive input signals from the input device 125 illustrated in FIGS. 2-5. The input device 125 may be a visual input signal that may include, but is not limited to, a graphical input signal such as a stylus signal or a gesture signal, a mouse signal, or a pointer signal. Each visual input signal may include a relatively large amount of data compared to a standard button signal from a remote control. The gesture signal may be on a screen or in front of a camera associated with the client device. Each signal may consist of a sequence of numerous sub-signals such as a sequence of multiple point and time positions representing the motion a user makes as an input signal. A graphical input signal might also consist of an image of sequence of images taken from a cell phone camera. An image processor 339 may be coupled to the receiving module 336. The image processor 339 processes the visual input signal to determine a desired control signal to be sent to the server device as a data signal. For example, an image of a face may unlock or reconfigure a client device. A face image may be used to configure setting of a set top box or server device associated with a user.

A voice signal may also be received through the input 338 to the receiving module 336. A voice processor 340 in communication with the receiving module 336 may process or recognize the audio signal and convert the audio voice signal into a text file. Ultimately, the inputs to the receiving module 336 may be communicated through the interface module 310 to the server device.

The data received through the receiving module 336 may be communicated directly to the interface module 310 and ultimately the server device with very little processing because very little processing power may be included within a client device 122. The receiving module 336 may convert the signals input into electrical signals for transmission or communication to the server device. For example, the raw voice signals may be communicated to the server device through the interface module 310. The raw voice signal may be essentially be recorded voice signals with no voice recognition applied thereto.

A clock 342 may communicate with various devices within the system so that the signals and the communications between the server device and client are synchronized and controlled.

In some examples the input signal 338 may be ignored. Ignoring the signal means that the device may not do anything more than receive the signal and not generate a response signal The client device 122 may also include a registration module 344. The registration module 344 allows the input device 125 to be registered with the client device 122. Registration of the input device 125 may include communicating an input device such as a serial number, model number or other type of unique identifier (or combinations thereof) from the input device 125 that is stored in the memory 316 by the registration module 344. The input device 125 may also include a plurality of command identifiers that are to be operated on by the client device 122. Multiple input devices 125 may be registered with a single client device 122. Each input device 125 may provide a unique identifier and a unique set of input signals that are to be responded on by the client device 122.

The registration module 344 may also be in communication with the server device 110 illustrated in FIG. 1 through the interface module 310. The registration module 344 may communicate a registration signal to the server device that indicates that an input device has been registered at the client device. A registration signal or an association signal may be communicated from the client device 122 to the server device to indicate the registration has occurred between the client device and the input device. The registration or association signal may also include the command signal, input device identifiers or other identifiers of the input device and an identification of the client device to which the client device will be responding.

A logic control module 346 may be used to for various control functions including determining whether to respond or not respond (ignore) received command signals from one or more input devices. The logic control module 346 is in communication with the receiving module 336 and the client module 330. Command signals requiring action may be communicated through the client module 330.

Figure 7:
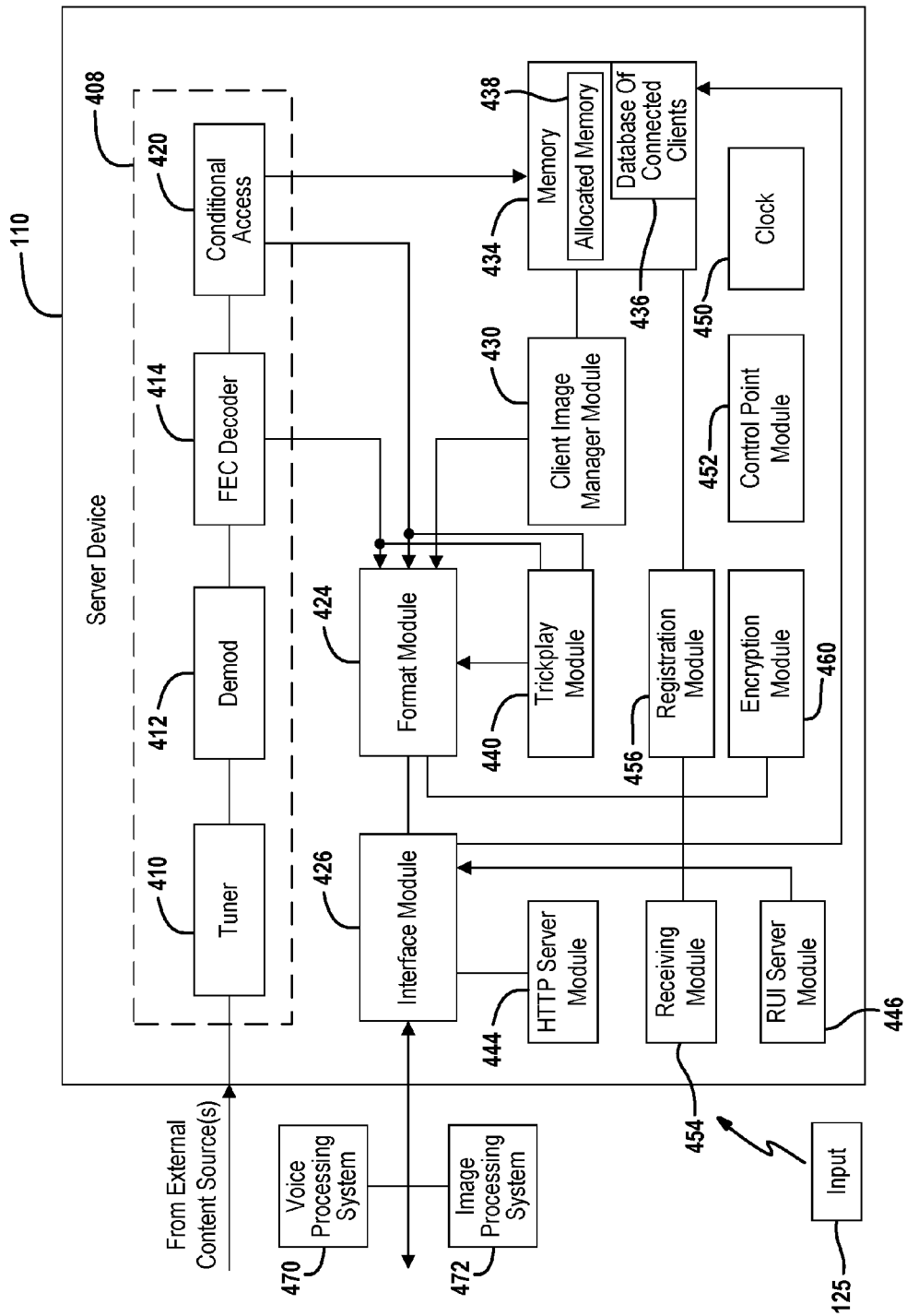
FIG. 7 is a block diagrammatic view of a server.

Referring now to FIG. 7, a server device 110 is illustrated in further detail. The server device 110 is used for communicating with various client devices 122. The server device 110, as mentioned above, may also be used for communicating directly with a display. The server device 110 may be a standalone device or may be provided within another device. For example, the server device 110 may be provided within or incorporated with a standard set top box. The server device 110 may also be included within a video gaming system, a computer, or other type of workable device. The functional blocks provided below may vary depending on the system and the desired requirements for the system.

The server device 110 may be several different types of devices. The server device 110 may act as a set top box for various types of signals such as satellite signals or cable television signals. The server device 110 may also be part of a video gaming system. Thus, not all of the components are required for the server device set forth below. As mentioned above, the server device 110 may be in communication with various external content sources such as satellite television, cable television, the Internet or other types of data sources. A front end 408 may be provided for processing signals, if required. When in communication with television sources, the front end 408 of the server device may include a tuner 410, a demodulator 412, a forward error correction decoder 414 and any buffers associated therewith. The front end 408 of the server device 110 may thus be used to tune and demodulate various channels for providing live or recorded television ultimately to the client device 122. A conditional access module 420 may also be provided. The conditional access module 420 may allow the device to properly decode signals and prevent unauthorized reception of the signals.

A format module 424 may be in communication with a network interface module 426. The format module 424 may receive the decoded signals from the decoder 414 or the conditional access module 420, if available, and format the signals so that they may be rendered after transmission through the local area network through the network interface module 426 to the client device. The format module 424 may generate a signal capable of being used as a bitmap or other types of renderable signals. Essentially, the format module 424 may generate commands to control pixels at different locations of the display.

The interface module 426 may be used for receiving input from the client device. For example, the network interface module 426 may receive various types of input data signals communicated from various input devices to the client devices. The data received through the network interface module may include data from a mouse, from a stylus or pointer device, a voice command, or other type of graphical or gesture command.

The network interface module 426 may also communicate with the internet. In the present example, when a voice signal or visual signal is provided the voice signal or visual input signal may be communicated to an external device such as a voice processing system 470 or image processing system 472 to perform voice recognition and return a text signal or command signal to the network interface module 426. The voice processing system 470 and the image processing system 472 may also be included within the server device as well.

The server device 110 may also be used for other functions including managing the software images for the client. A client image manager module 430 may be used to keep track of the various devices that are attached to the local area network or attached directly to the server device. The client image manager module 430 may keep track of the software major and minor revisions. The client image manager module 430 may be a database of the software images and their status of update.

A memory 434 may also be incorporated into the server device 110. The memory 434 may be various types of memory or a combination of different types of memory. These may include, but are not limited to, a hard drive, flash memory, ROM, RAM, keep-alive memory, and the like.

The memory 434 may contain various data such as the client image manager database described above with respect to the client image manager module 430. The memory 434 may also contain other data such as a database of connected clients 436. The database of connected clients may also include the client image manager module data.

The memory 434 may also include an allocated memory 438. The allocated memory 438 may also be referred to as a buffer. The allocated memory 438 may vary in size. The memory for the allocated memory 438 is reserved or allocated based on allocate memory commands from the client device as described below. The memory 434 may also be used to store advertisements or other insertion content. The insertion content may be received at various times and stored for ultimate delivery to the clients.

A trick play module 440 may also be included within the server device 110. The trick play module 440 may allow the server device 110 to provide renderable formatted signals from the format module 424 in a format to allow trick play command signals such as rewinding, forwarding, skipping, and the like. Trick play may be initiated by selecting or pushing various buttons on a remote control or input device 125.

An HTTP server module 444 may also be in communication with the network interface module 426. The HTTP server module 444 may allow the server device 110 to communicate with the local area network. Also, the HTTP server module may also allow the server device to communicate with external networks such as the Internet.

A remote user interface (RUI) server module 446 may control the remote user interfaces that are provided from the server device 110 to the client device 122.

A clock 450 may also be incorporated within the server device 110. The clock 450 may be used to time and control the various communications with the various client devices 122.

A control point module 452 may be used as a controller to control and supervise the various functions provided above within the server device. The functions may ultimately include, but are not limited to, storing the command data in the allocated memory 438, processing the data to determine what response is desired for the data and generating a response signal to the client. The control point 452 may also be used to determine which input signals to act upon. This will be described in more detail below. As mentioned above with respect to the client device, the server may not act on each of the signals from the input device. Further, multiple input devices may be associated with a client device and a server device 110.

It should be noted that multiple tuners and associated circuitry may be provided. The server device 110 may support multiple client devices 122 within the local area network. Each device is capable of receiving a different channel or data stream. Each client device may be controlled by the server device to receive a different renderable content signal.

The server device 110 may also include a receiving module 454 that is used to receive input from a remote control or other input device 125. The receiving module 454 may be in communication with a registration module 456. The registration module 456 acts in a similar manner to that of the registration module 344 set forth above in FIG. 6. The registration module 456 may be used to register communication with an input device 125. The registration module 456 may also record the registration or association of the client device and the input device that is communicated to the server device 110. The registration module 456 may be in communication with the memory 434 that stores the registration therein. As mentioned above, the registration may be performed by communicating a unique identifier from the input device 125 to the server device 110. The input signal may include a unique identifier and other data such as input signal identifiers that the server device should respond to.

An encryption module 460 may also be incorporated into the server device 110 for encrypting the output of the server 110. The encryption module 460 may also provide digital transmission content protection (DTCP) to copy protected content.

Figure 8:
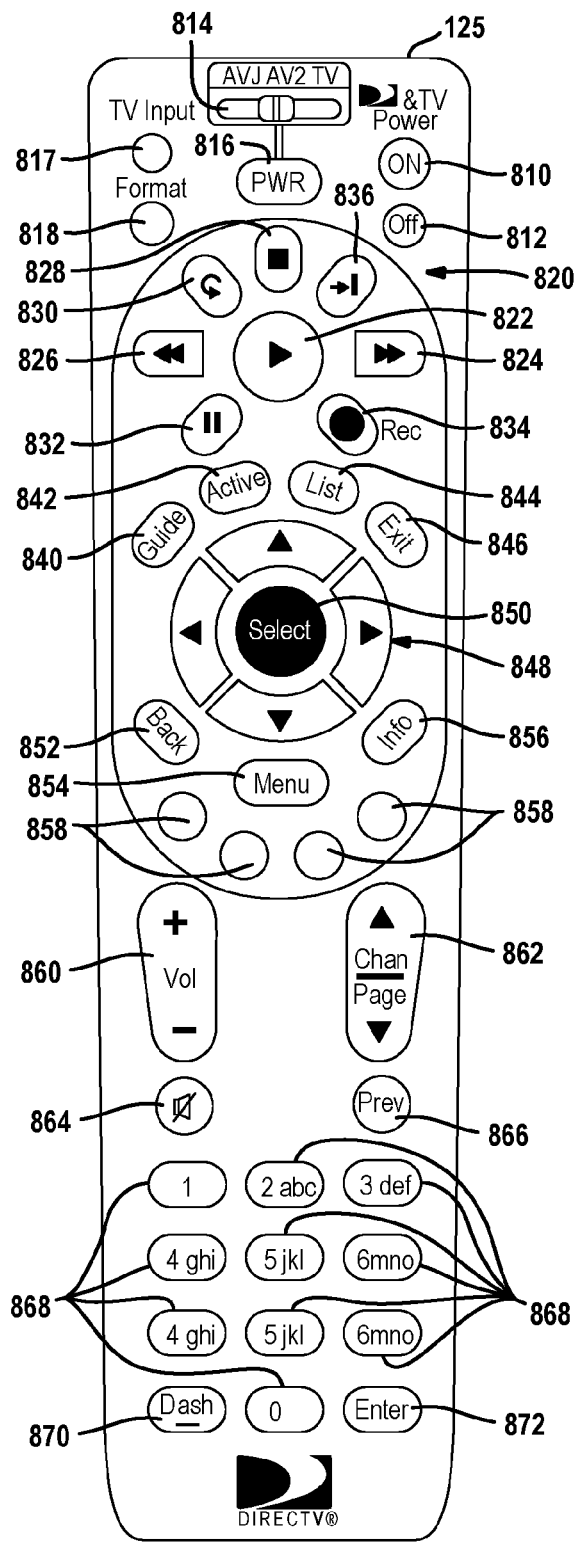
FIG. 8 is a plan view of a primary remote control device.

Referring now to FIG. 8, an input device 125 is illustrated. The input device 125 may include various buttons and switches to provide key press values in key command signals to the set top box to provide various inputs. An ON button 810 and an OFF button 812 may be provided for turning on and off a television and receiving unit. A power button 816 may also be provided for turning on and off power to a device selected by the switch 814. A TV input button 817 may also be provided for providing an auxiliary input to the television. A format button 818 may be used for selecting the format of the screen display such as standard definition or high definition. A DVR control portion 820 may also be provided. The DVR control buttons may include a play button 822, a forward button 824, a reverse button 826, a stop button 828, a repeat button 830, a pause button 832, a record button 834, and a jump button 836. Buttons 822-836 may be used to perform trickplay functions. A guide button 840 may be used for displaying the program guide. An active button 842 may be used for accessing special features, services and information such as news. A list button 844 may be used to display a to-do list of programs. This may be associated with the digital video recorder. An exit button 846 exits the menu screen and the program guide. Arrow keys 848 may be used to move around in the program guide and various menu screens.

A select button 850 is used to choose or select a highlighted item in a menu or in a program guide. A back button 852 may be used to return to a previously displayed screen. A menu button 854 may be used to display a menu. An information button 856 may be used to display the current channel and program information when watching live television or in the guide. Color buttons 858 may be used to cycle through various available alternative audio tracks. The colored buttons may also give various functionality and various menus within the receiving unit.

A volume switch 860 may be used for increasing or decreasing the volume. The volume switch 860 may be a rocker switch. A channel or page button 862 may also be a rocker switch. The channel or page button 862 may be used to select the next higher or lower channel or higher or lower page in a program guide menu. A mute button 864 may also be provided. The mute button 864 may turn the sound from the receiving unit on or off. A previous button 866 may be used to return to the last viewed channel. Numerical buttons 868 may have a number and a letter assigned thereto. By selecting a number, a number key value may be provided to the receiving unit for inputting a particular number into a menu when making a selection. The number buttons 868 may also be used for providing letters into the receiving unit. For example, the "2" button may also have "A B C" associated therewith. A keypad for a telephone is similarly configured. A dash key 870 may be provided for inputting a dash for a sub-channel number. An enter button 872 may be used for entering the code in a menu.

Figure 9:
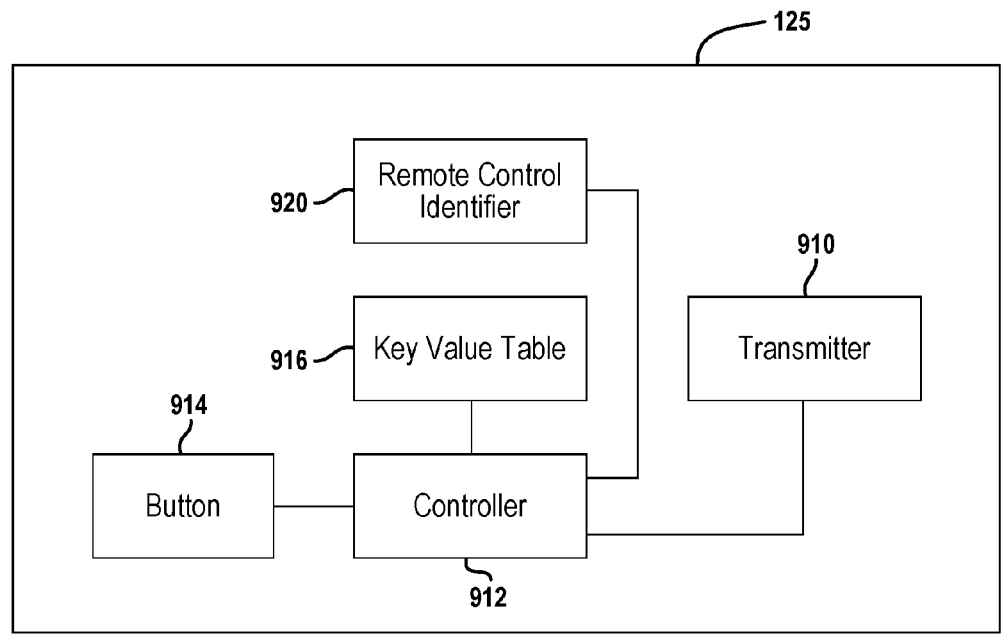
FIG. 9 is a block diagrammatic view of a remote control device.

Referring now to FIG. 9, the input device 125 illustrated in FIG. 8 may include a transmitter 910 that is used for transmitting a signal to the server device 110 and the client device 122 illustrated in FIGS. and 2-5. The transmitter 910 may be one of a variety of different types of remote control transmitters including an infrared transmitter or an RF transmitter. The input device 125 also includes a controller 912. The controller 912 receives a signal from a button 914. Button 914 represents all the buttons in FIG. 3. Only one button is illustrated in FIG. 9 for simplicity. The selection or operation of button 914 causes the controller 912 to obtain a key value signal or code from a key value table 916. The key value table 916 has a unique identifier for each of the buttons. The controller 912 also receives a remote control device identifier from a remote control device identifier memory 920. The controller 912 transmits a control word that includes a remote control device identifier and a key value from the key value table 916 upon every button push.

Figure 10:
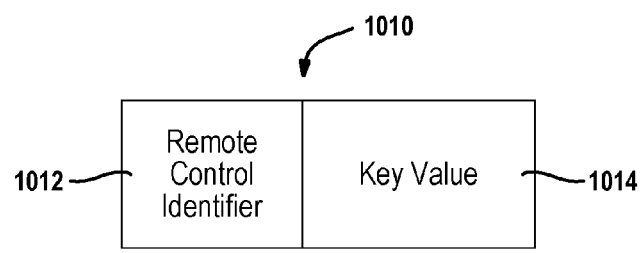
FIG. 10 is a representation of a control word generated by a remote control device.

Referring now to FIG. 10, a control word 1010 is illustrated having a remote control device identifier 1012 and a key value 1014. The remote control device identifier 1012 identifies the remote control device so that the proper server or client device may respond thereto. The key value 1014 corresponds to the value of the key or button selected on the remote control device. Every time a button is selected, a remote control device identifier 1012 and a key value 1014 may be transmitted to the client device, the server device or both.

Figure 11:
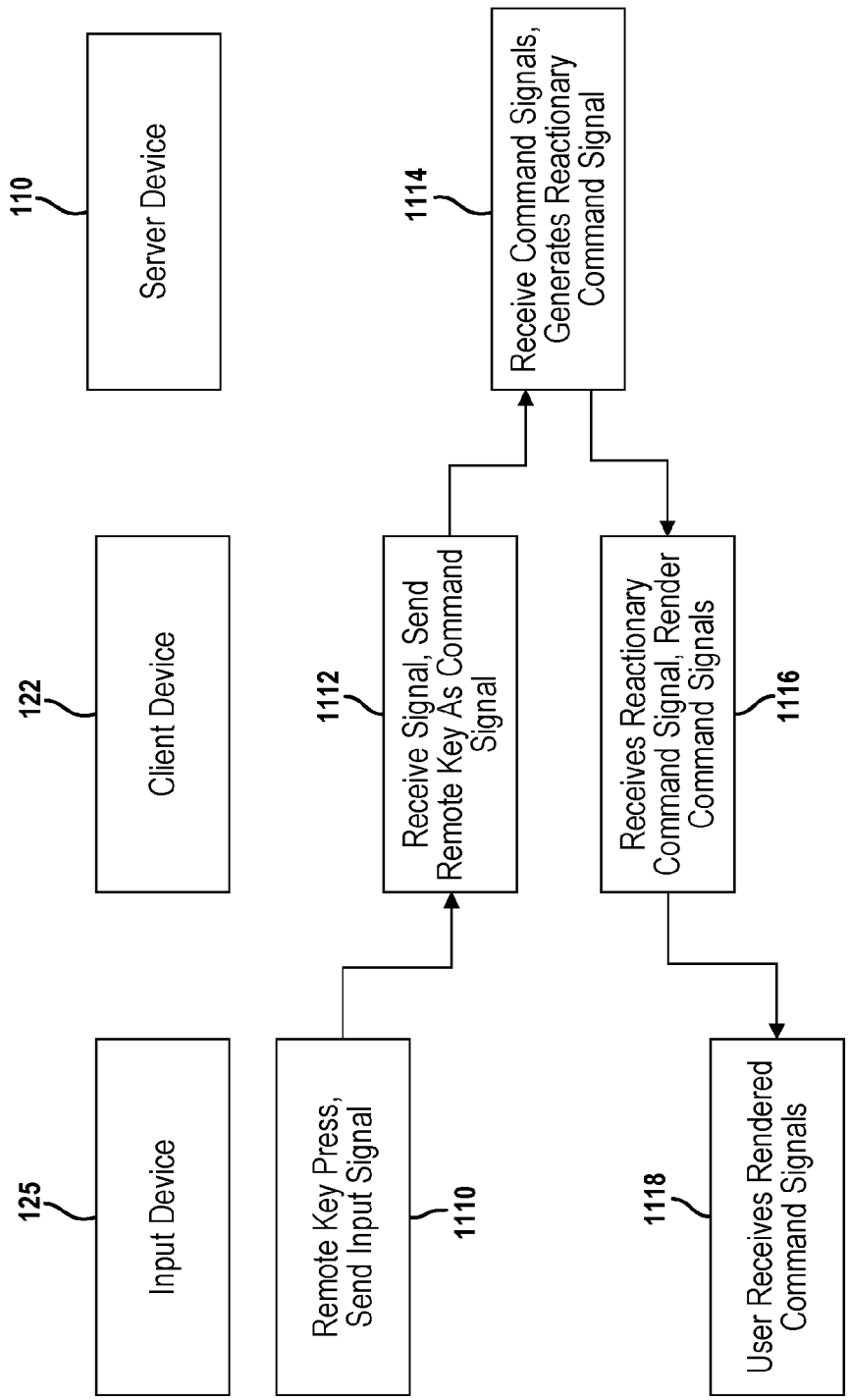
FIG. 11 is a flowchart of a method for operating an RVU type system in a conventional way.

Referring now to FIG. 11, a diagrammatic flow chart illustrating the input device 125, the client device 122 and the server device 110 and their interactions are set forth. In this example, the input device 125 generates input signals 1110 that are communicated to the client device 122. The client device 122 receives the signals and sends remote key signals as command signals to the server device 110 in step 1112. In step 1114, the server device receives the command signals and generates a reactionary command signal at step 1114. The client device receives the reactionary command signals and renders the command signals for display on the display. In step 1118, the user receives the rendered command signals by viewing the display associated with the client device. The illustration set forth in FIG. 11 corresponds to the current form of RVU.

Figure 12:
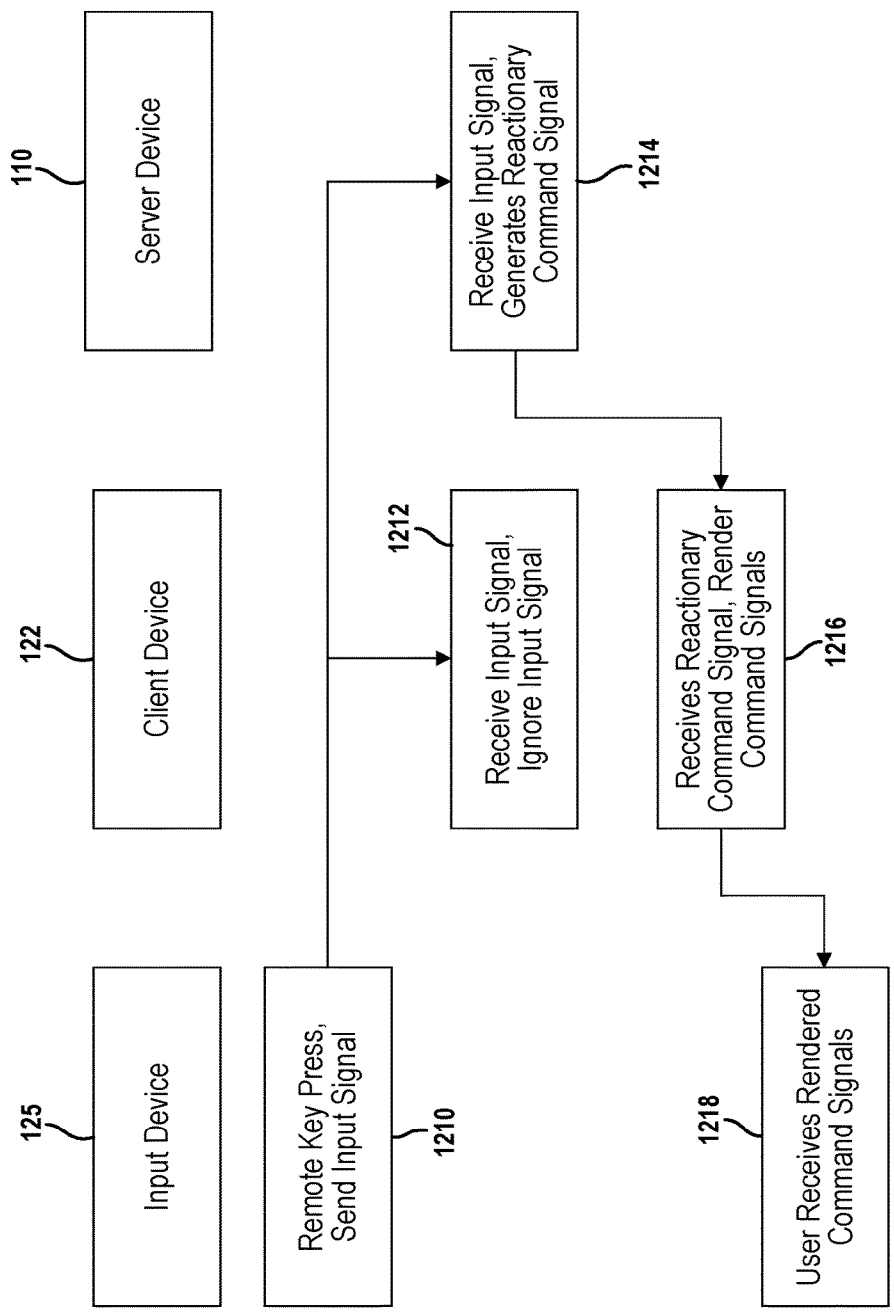
FIG. 12 is a first example of the present disclosure for operating the client device and server device in response to input signals.

Referring now to FIG. 12, an improved communication system is set forth. As was illustrated in FIG. 11, signals are communicated between the client device and the server device and then again from the server device back to the client device. Some delays are associated with communicating through a network.

In FIG. 12, a flow chart relative to the input device, client device 122 and the server device 110 is set forth. In this example, a remote key press sends an input signal in step 1210 from the input device to the client device 122 and server device 110. The input signal may be broadcasted to various devices. In step 1212 the input signal is received and ignored at the client device 122.

In step 1214, the server device receives the input signal and generates a reactionary command signal that is communicated to the client device 122. The reactionary command signal is rendered at the client device 122 step 1216. The user receives the rendered command through the display of the client device. That is, the screen display may be changed based upon the command signal of step 1216 in step 1218. In the example set forth in FIG. 12, the server device reacts directly with the input signal and thus bypasses the communication link between the client device and the server device. These actions may take place when the client device and the server device are properly registered. The benefit of such a system is a delayed time between translating the remote control command to a network communicable signal is not performed at the client device and then communicated to the server, but rather the server responds directly in FIG. 12. Thus, the latency introduced by the client device when translating the remote control signal to a command is reduced. It should be noted that the above sequence of steps would benefit applications that require low latency and generate large numbers of input commands. An example of this is using gesture commands such as dragging a finger on a touchpad. A large number of position events are generated and sent to server to process and generate response signals.

Figure 13:
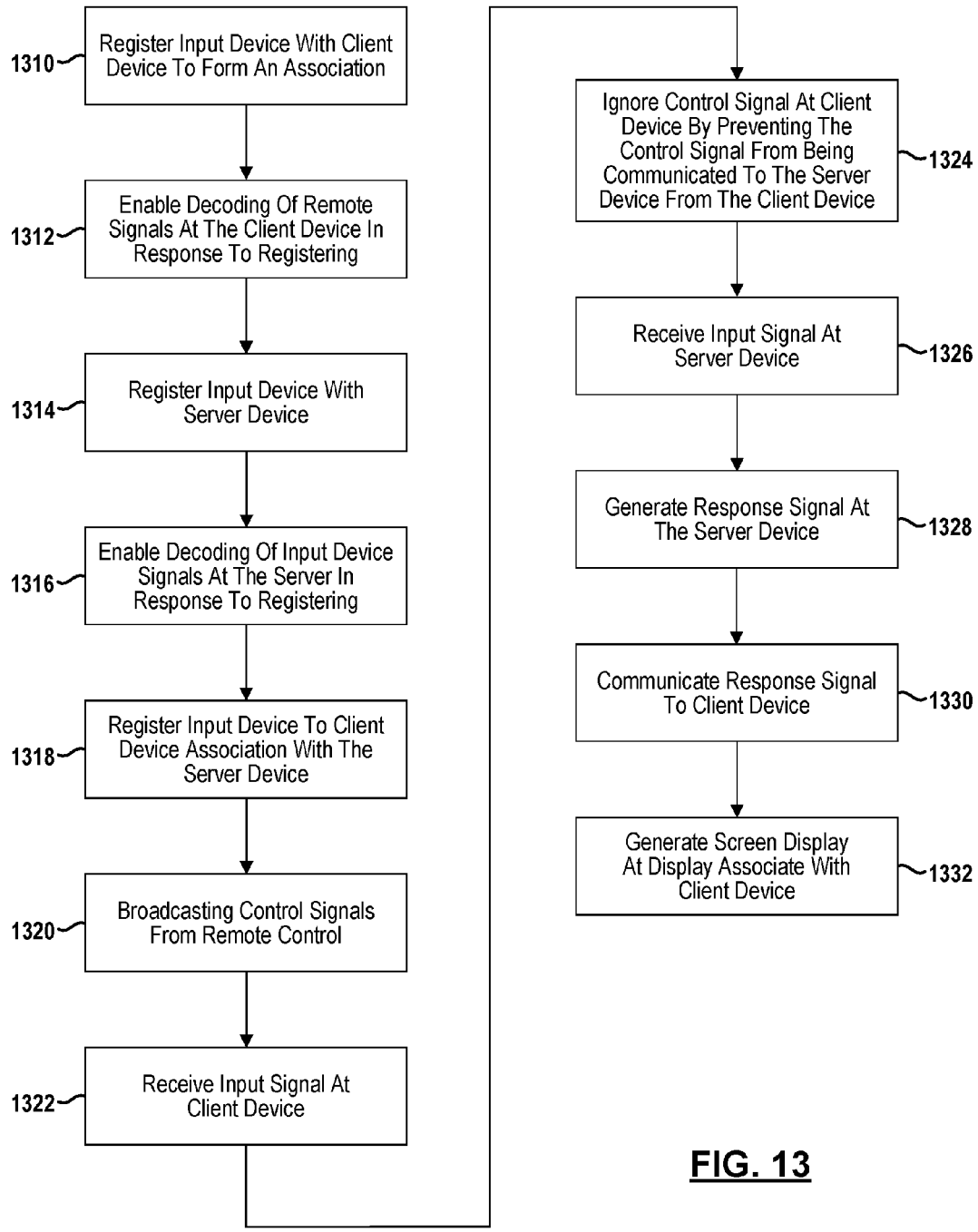
FIG. 13 is a flowchart of a method for registering an input device with the client and the server.

Referring now to FIG. 13, a method for performing communication between the client device and the server device is set forth. As mentioned above, registration of an input device with the client device and the server device is required to allow communication such as that set forth in FIG. 12. In step 1310, the input device, such as the remote control, is registered with the client device. As mentioned above, the client device may receive a registration signal from an input device. The registration signal may include a unique identifier such as an input device identifier. A model number, brand identifier or serial number may also be part of the registration signal. The communication of the registration signal may be triggered using various keys on the input device as well as activation of a user interface associated with the client device. Once the input device identifier and other data such as the device type identifiers an association is formed between the input device and the client device.

In step 1312, the decoding of remote signals at the client device is enabled in response to registering. The decoding of the signals may be performed on a mapped basis that corresponds to the key generated input signals received by the client device.

In step 1314, the input device is registered with the server device. This may take place in a similar manner to that described above relative to the client device. That is, the input device may generate a registration signal including an input device identifier that is ultimately stored within the memory of the server device. The other device type identifiers may also be included in the registration signal. In step 1316, the server is enabled to decode the input signals of the input device in response to registering. In the case of both the client device and the server device, unregistered inputs may not be decoded by the respective devices.

In step 1318 the association of step 1310 is registered with the server device. An association signal that includes a client device identifier and a remote control identifier may be communicated to the server device through a local area network. The association is registered in the server device.

In step 1320, input signals corresponding to key press signals are broadcasted from the remote control in step 1320. In step 1322, the input signal is received at the client device. In step 1324, the input signal is ignored at the client device. In step 1326, the input signal is received at the server device directly from the input device without the input signal being communicated from the client device to the server device through the local area network. In step 1328, a response signal that is a reactionary command signal is generated at the server device. In step 1330, the response signal is communicated to the client device. In step 1332, a screen display associated with the client device is generated in response to the reactionary signal. As mentioned above, the signal may be rendered at the client device.

Figure 14:
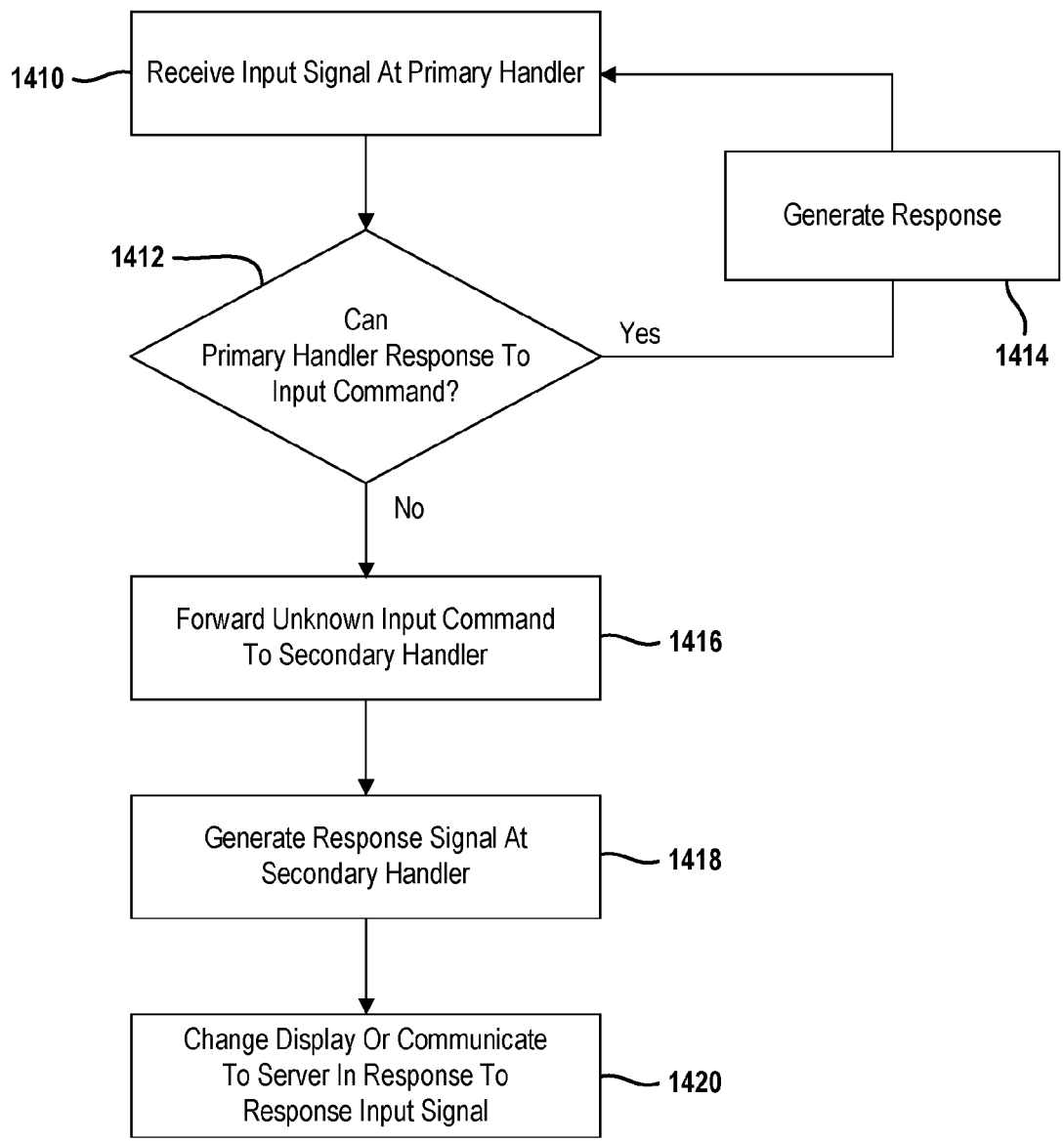
FIG. 14 is a flowchart of a method for secondary handling of input commands.

Referring now to FIG. 14, a method for changing the display or communicating with the server is set forth. In step 1410, an input signal is received at a primary handler. The primary handler designation is negotiated between the client device and the server device. The primary handler may be the primary device or the server device depending on the negotiation. In the example set forth immediately above in FIG. 13, the server device is the primary handler. In some cases the primary handler may not be capable of responding to a signal. Therefore, step 1412, determines whether the primary handler can respond to the input command if the primary handler can respond to the input demand, a response signal is generated in step 1414. Various types of responses may be generated, including changing a screen display. After step 1414, step 1410 is again executed.

Referring back to step 1412, when the primary handler cannot respond to an input signal, step 1416 forwards the unknown input command to a secondary handler such as the client device when the primary handler is the server device. In step 1418 a response signal is generated at the secondary handler. In step 1420, the display is changed or the command is communicated to the server in response to the input signal.

Figure 15:
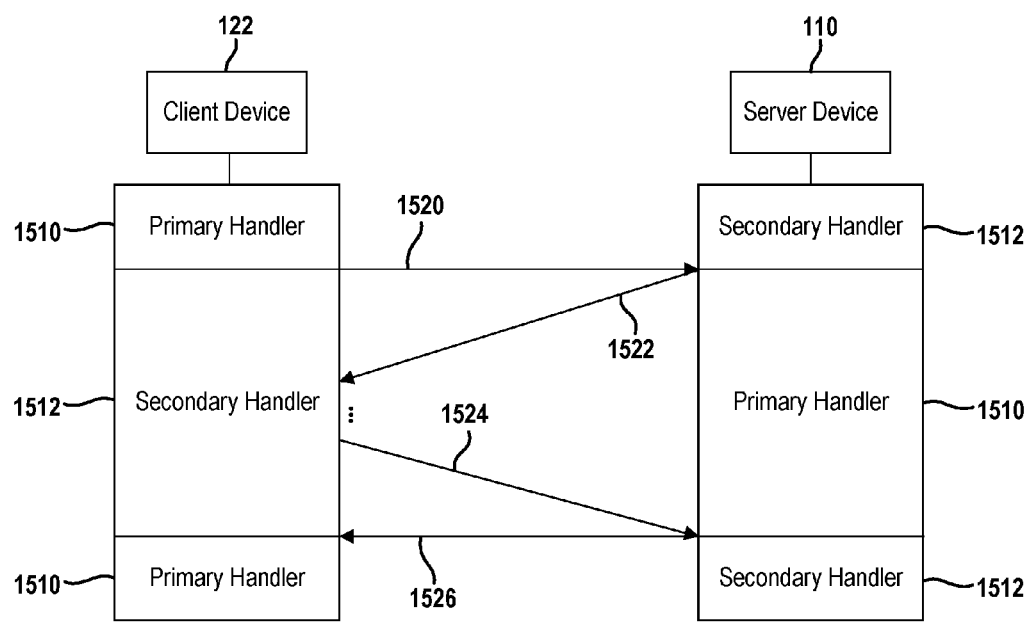
FIG. 15 is a flowchart representing changing devices from a primary handler to a secondary handler.

Referring now to FIG. 15, in order for the primary handler and secondary handler to operate properly, the client device 122 and the server device 110 must communicate to form the transitions. In FIG. 15, the primary handler designation 1510 and the secondary handler designation 1512 alternate in response to various signals. In the top portion of FIG. 15, the client device 122 is the primary handler 1510. The primary handler 1510 is the device that handles the input signals from the remote control. The secondary handler receives the signals from the primary handler after being received by the primary handler 1510.

In FIG. 15, the primary handler and secondary handler may be changed between the client device 122 and the server device 110 to allow the other device to handle the input signals from the input device. When the client device 122 is the primary handler as is set forth in the top of FIG. 15, a "remote handle release" signal 1520 is communicated to the secondary handler 1512. The secondary handler 1512 becomes the primary handler 1510 and generates a response signal 1522 in response thereto. The response signal 1522 informs the client device 122 that the server device is now the primary handler. When the secondary handler 1512, in this portion of the example client device 122, needs to request becoming the primary handler a "remote handle get" signal 1524 is communicated to the server device. Upon receipt of the "remote handle get" signal 1524, the primary handler 1510 generates a response signal 1526 to the client device. The server device then becomes a secondary handler at the bottom of FIG. 15 and the client device 122 becomes the primary handler. Preferably, the periods between both devices becoming a primary handler or secondary handler are minimized.

Figure 16:
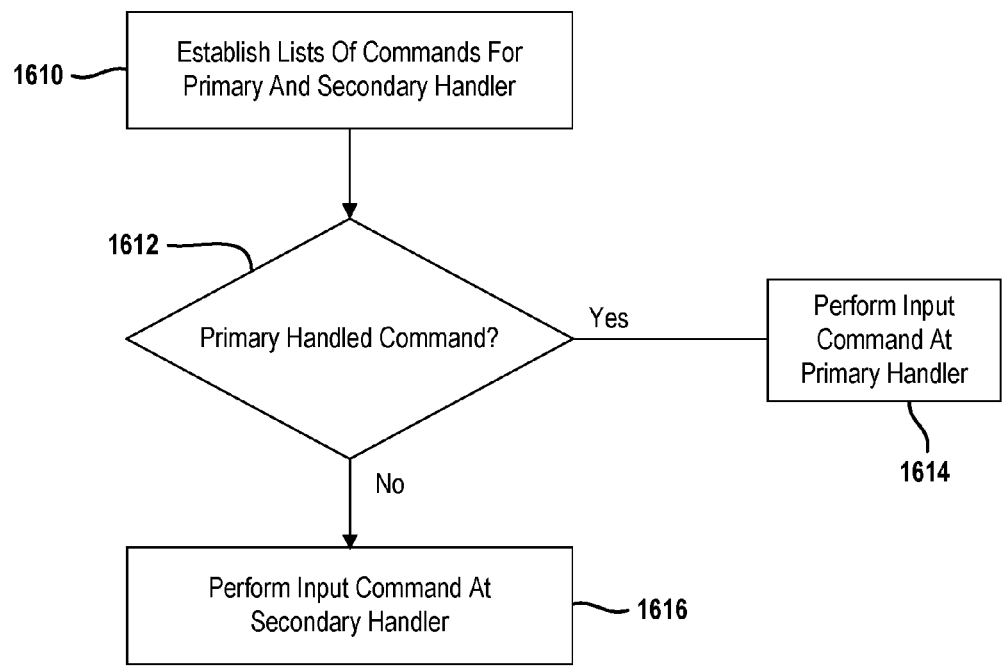
FIG. 16 is a flowchart of a method of handling commands at either a primary handler or secondary handler in response to a list.

Referring now to FIG. 16, in certain situations, the primary handler and secondary handler may be designated to act upon different sets of input commands. In step 1610, a list of commands for each of the primary and secondary handler is established. The establishment of the list may take place during the registration process. The registration process may, for example, designate a primary handler for certain commands. In one example, trickplay commands may be designated to be acted upon by the server device in a first list and all other commands may be acted upon by the client device. In step 1612, if the command is a primary handler command, the command is received and a response signal is generated in step 1614. In step 1612, if the command is not a primary handler command, step 1616 is performed in which the input command is processed at the secondary handler. In step 1614 and step 1616, the second-ary handler and the primary handler ignore the input commands, respectively. That is, the handlers may not generate a response to the input commands and may not forward the input command to the other handler.

Figure 17:
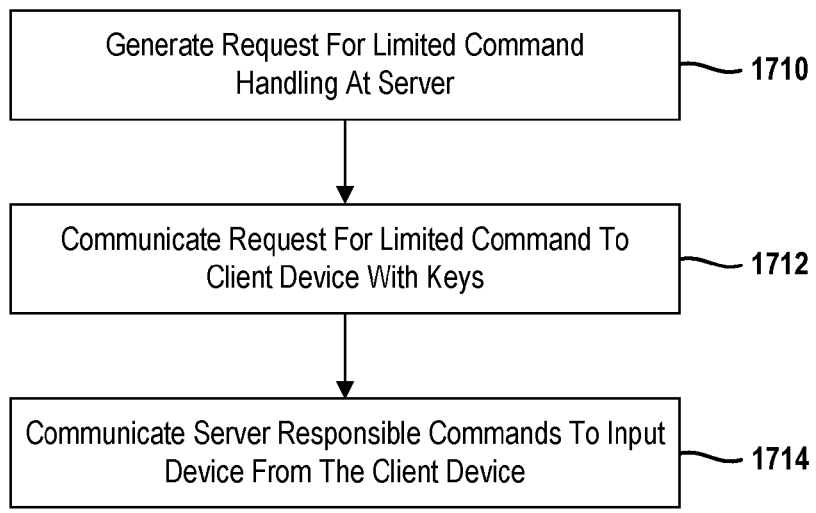
FIG. 17 is a flowchart of a method for limited command handling.

Referring now to FIG. 17, a step of generating a request for a limited command handling at the server is performed. The request to handle the limited command is communicated to the client device with the key strokes or input signal identifiers. This is performed in step 1712. In step 1714, a list of server responsible commands is communicated to the input device from the client in step 1714. This allows the input device to communicate the commands desirable to be handled by the client device or the server device. The input device may be capable of communicating not only its own identifier, but the identifier of the server device or the receiver device.

Figure 18:
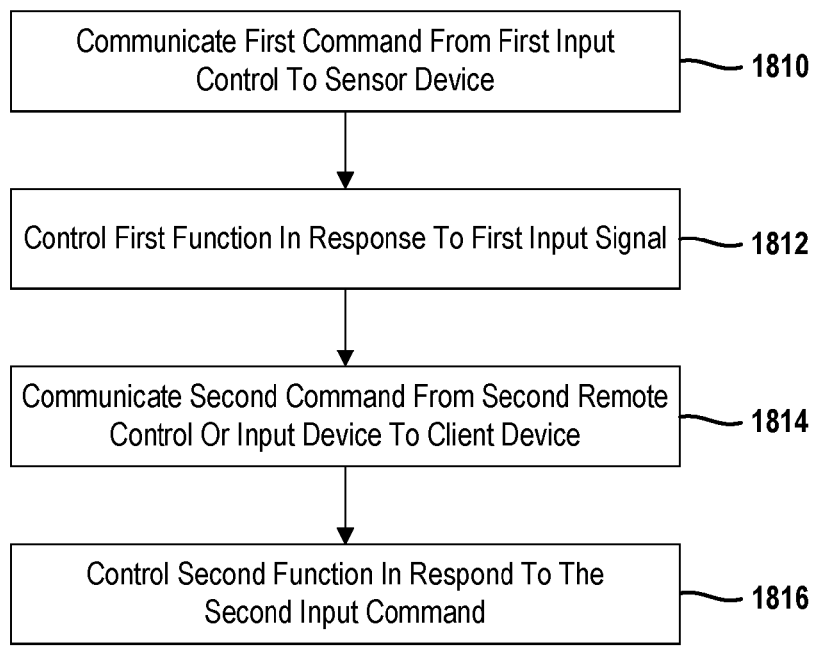
FIG. 18 is a flowchart of a method for handling different commands at a client and server.

In FIG. 18, step 1810 communicates a first command from the first input device to the server device. In step 1812, a first function is controlled in response to the first input signal. In step 1814, a second command is communicated from the second input device to the client device. In step 1816, a second function is controlled in response to the second input command. In this manner, the first command and second command are separately acted upon. In this manner, different input devices may be used by different devices for control. That is, a first input device input signal is used by the client device and the second input device input signal is used by the server device.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method of communicating between a client device and a server device in a local area network comprising:
   registering an input device with the client device by communicating a first registration signal from the input device to the client device so that the client device can decode signals from the input device;
   forming an association between the input device and the client device in response to registering the input device;
   registering the input device with the server device by communicating a second registration signal from the input device to the server device so that the server device can decode signals from the input device;
   registering the association between the input device and the client device with the server device;
   controlling a screen display of the client device from the server device through the local area network, said server device decoding a received signal at a decoder and, said client device comprising a rendering module without including the decoder, said client device receiving broadcast signals only via the server and decoder through the local area network;
   designating a first plurality of control signals for the client device;
   designating a second plurality of control signals different from the first plurality of signals for the server device;
   directly receiving a first signal of the first plurality of signals at the client device and directly receiving the first signal at the server device not through the client device to bypass the local area network;

ignoring the first signal received at the server device when the first signal is one of the first plurality of control signals by not generating a first response thereto;

in response to directly receiving the first signal at the client device, generating a first response signal at the client device not from the server device;

changing a display associated with the client device in response to the response signal;

directly receiving a second signal of the second plurality of signals at the client device and directly receiving the second signal at the server device not through the client device to bypass the local area network;

in response to directly receiving the second signal at the client device, when the second signal is one of the second plurality of signals ignoring the second signal at the client device by not generating a second response thereto;

in response to directly receiving the second signal at the server device, generating a second response signal at the server device and not from the client device;

formatting the second response signal for rendering at the client device by generating commands or instructions for placement of pixels on the display associated with the client device;

communicating the second response signal to the client device through the local area network;

rendering the second response signal at the client device within the rendering module without decoding at the client device to form a rendered response signal by determining a placement of pixels from the commands; and displaying the pixels in the placement corresponding to the rendered response signal at the display associated with a client device.

2. The method as recited in claim 1 wherein the second plurality of signals comprise trick play commands.

3. The method as recited in claim 1 wherein the first plurality of control signals correspond to a first input device and the second plurality of control signals correspond to a second input device.

4. The method as recited in claim 3 wherein one of the first input device and the second input device comprises a remote control.

5. The method as recited in claim 3 wherein the first input device comprises a first remote control and the second input device comprises a second remote control.

6. A system comprising:
an input device communicating a first registration signal and a second registration signal;
a client device receiving the first registration signal and registering an input device so that the client device can decode signals from the input device, said client device forming an association with the input device in response to registering the input device;
a server device receiving the second registration signal, registering the input device so that the server device can decode signals from the input device and registering the association with the server device;

said client device having a first plurality of control signals designated therefore, said client device comprising a rendering module and not including a decoder;

said server device in communication with the client device through a local area network, said server device controlling a screen display of the client device, said server device having a second plurality of control signals different from the first plurality of signals designated therefore, said server device comprising a decoder receiving broadcasted signals;

said client device and the server device directly receiving a first signal of the first plurality of signals to bypass the local area network, said client device receiving broadcast signals only via the server and decoder through the local area network;

said server device ignoring the first signal received when the first signal is one of the first plurality of control signals by not generating a first response thereto;

said client device generating a first response signal at the client device in response to directly receiving the first signal at the client device;

said client device sending the first response signal on a display associated with the client device;

said client device and said server device directly receiving a second signal of the second plurality of signals not through the client device to bypass the local area network;

said client device, in response to directly receiving the second signal, ignoring the second signal when the second signal is one of the second plurality of signals by not generating a second response thereto;

said server device generating a second response signal and not from the client device in response to directly receiving the second signal at the server device and formatting the second response signal for rendering at the client device by generating command or instructions for placement of pixels on the display associated with the client device;

said server device communicating the second response signal from the server device to the client device through the local area network;

said client device, within the rendering module, rendering the second response signal on the display to form a rendered response signal without decoding by determining placement of pixels from the commands; and said display displaying the pixels in the placement corresponding to the rendered response signal.

7. The system as recited in claim 6 wherein the second plurality of signals comprise trick play commands.

8. The system as recited in claim 6 wherein the first plurality of control signals correspond to a first input device and the second plurality of control signals correspond to a second input device.

9. The system as recited in claim 8 wherein one of the first input device and the second input device comprises a remote control.

10. The system as recited in claim 8 wherein the first input device comprises a first remote control and the second input device comprises a second remote control.

* * * * *